US006629406B2

United States Patent
Tardif

(10) Patent No.: US 6,629,406 B2
(45) Date of Patent: Oct. 7, 2003

(54) APPARATUS FOR PRUNING FIELD CROPS AND LOW BUSHES

(75) Inventor: Jean-Roch Tardif, Rivière-du-Loup (CA)

(73) Assignee: Tardif 2000, Riviere-du-Loup (*) Notice: Subject to any disclaimer, the term of this patent is extended or adjusted under 35 U.S.C. 154(b) by 0 days.

(21) Appl. No.: 09/923,420

(22) Filed: Aug. 8, 2001

(65) Prior Publication Data

US 2003/0029151 A1 Feb. 13, 2003

(51) Int. Cl.[7] .................. A01D 34/24; A01D 34/42; A01D 34/63
(52) U.S. Cl. .................. 56/15.1; 56/6; 56/DIG. 14
(58) Field of Search .................. 56/6, 15.1, 16.2, 56/15.2, 15.5, 15.6, DIG. 3, DIG. 13, DIG. 14, 233, 234

(56) References Cited

U.S. PATENT DOCUMENTS

| | | | | |
|---|---|---|---|---|
| 3,087,296 A | * | 4/1963 | Cowles | 56/10.7 |
| 3,462,925 A | * | 8/1969 | Lanier | 56/10.9 |
| 3,599,412 A | | 8/1971 | Lefevre et al. | |
| 3,608,284 A | * | 9/1971 | Erdman | 56/6 |
| 3,949,539 A | * | 4/1976 | Cartner | 56/10.4 |
| 4,048,790 A | * | 9/1977 | Zweegers | 172/311 |
| 4,135,349 A | * | 1/1979 | Schwertner | 56/503 |
| 4,370,846 A | * | 2/1983 | Arnold | 56/16.2 |
| 4,631,910 A | | 12/1986 | Doyen et al. | |
| 4,926,621 A | * | 5/1990 | Torras | 280/494 |
| 5,133,174 A | * | 7/1992 | Parsons, Jr. | 56/10.09 |
| 5,210,997 A | * | 5/1993 | Mountcastle, Jr. | 56/11.9 |
| 5,341,629 A | * | 8/1994 | Penner | 56/15.2 |
| 5,463,857 A | * | 11/1995 | Blosser | 56/238 |
| 5,485,718 A | | 1/1996 | Dallman | |
| 5,570,571 A | | 11/1996 | Dallman | |
| 5,733,385 A | | 3/1998 | Dallman | |

FOREIGN PATENT DOCUMENTS

CA 2117115 3/1994

* cited by examiner

Primary Examiner—Árpád F Kovács
(74) Attorney, Agent, or Firm—Ogilvy Renault

(57) ABSTRACT

A pruning apparatus, particularly for pruning low bushes on the ground, such as blueberry bushes, includes a wheeled main frame to be towed behind a tractor, and a plurality of ground work units pivotally connected to the main frame. The units are positioned in front and rear rows and each is selectively positioned in a transverse position. Thus a pruning area effected by one of the unit overlaps an adjacent pruning area of another unit. The connection between each unit and the main frame permits the unit not only to pivot about a vertical axis, but also to pivot slightly about a horizontal axis in a forward direction so that the apparatus is adapted to conform to a contour of uneven portions of a ground surface. Each ground work unit has a drive shaft attached with a plurality of tool member assemblies. The tool member assemblies are so designed as to effect a cutting and flailing action on the blueberry bushes, thereby cutting and slashing the blueberry bushes.

9 Claims, 6 Drawing Sheets

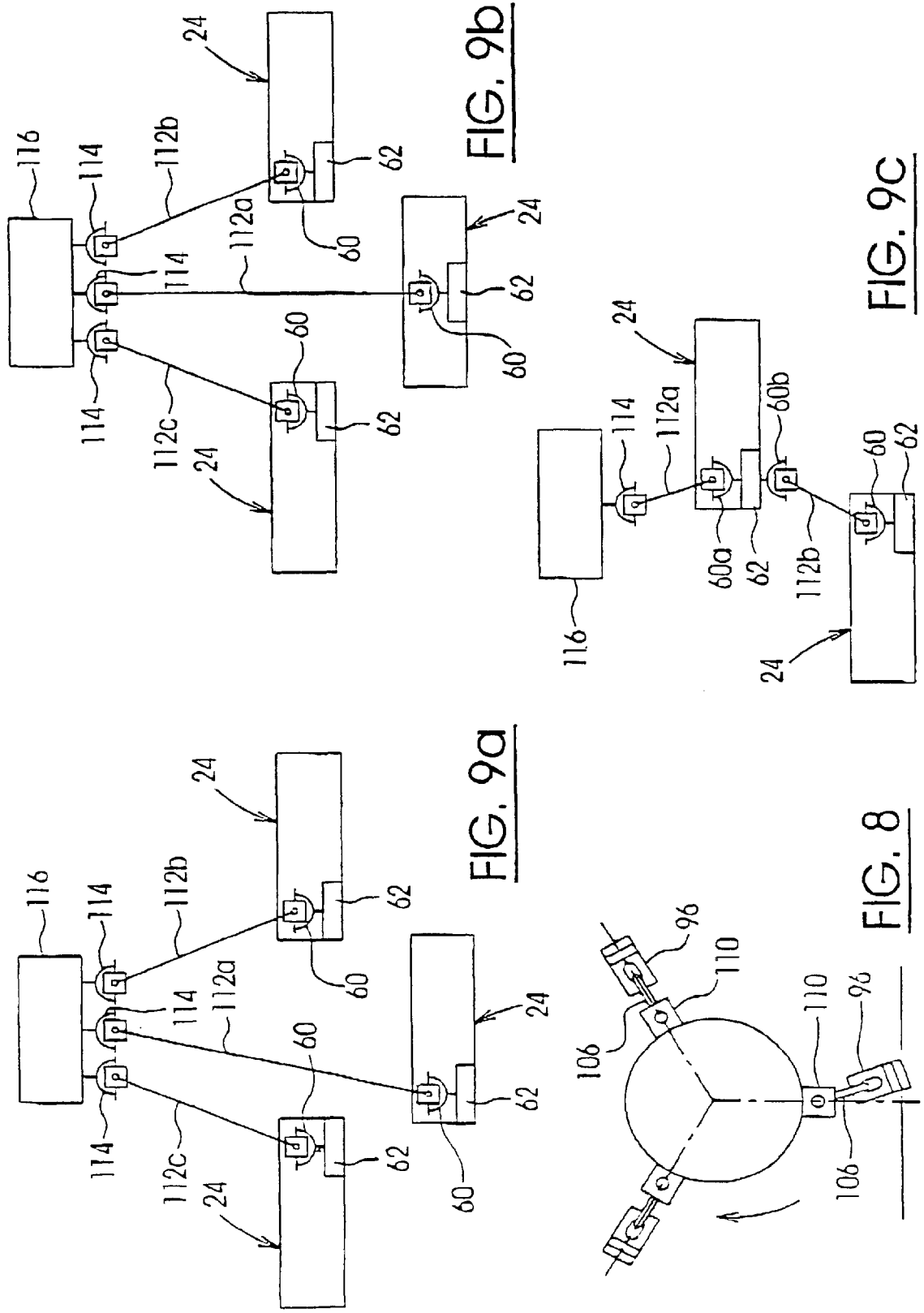

APPARATUS FOR PRUNING FIELD CROPS AND LOW BUSHES

BACKGROUND OF THE INVENTION

1. Field of the Invention

The present invention relates to a ground-working machine and, more particularly, to an agricultural machine for pruning field crops, and low bushes on a commercial scale.

2. Description of the Prior Art

It is well known that Blueberries and like perennial crops may be treated periodically by pruning the bushes and thereby encourage future regrowth and improve fruit output. Conventionally, pruning of Blueberry bushes on a commercial scale is accomplished by burning off of the plants with oil fired burners. While this effectively prunes the plants without serious damage to their root systems, it also destroys much of the organic material in the soil, and is fairly energy intensive. This is also not an environment-friendly method of pruning the bushes.

Flail type cutting and shredding machines are well known in the agricultural industry but have not been popularly used to prune bushes of Blueberries and like perennial crops. Flail type cutting and shredding machines generally comprise a plurality of hangers fixed around the outside perimeter of a shaft. A plurality of small blades are hooked onto the hangers by means of a bolt positioned through a pair of the hangers. The shaft is rotated by a pulley and belt assembly or chain and sprocket assembly and carried over the ground on a roller or on skid shoes, and the blades slash into the bushes which are to be cut. The pulley and belt or the chain and sprocket assemblies may be driven by an hydraulic motor attached to the machine or driven by the power take-off system of a towing vehicle by means of a driving shaft and universal joints. Examples are described in U.S. Pat. No. 3,599,412, entitled FLAIL SHREDDER and issued to Lefeuvre et al. on Aug. 17, 1971, U.S. Pat. No. 5,485,718, entitled FLAIL CUTTER AND METHOD OF PROVIDING A FLAIL CUTTER FOR A BRUSH CUTTING MACHINE and issued to Dallman on Jan. 23, 1996, and U.S. Pat. Nos. 5,570,571 and 5,733,385, both entitled BLADE FOR A FLAIL TYPE BRUSH CUTTING MACHINE and issued to Dallman on Nov. 5, 1996 and Mar. 31, 1998 respectively. Dallman improves the flail type cutting machine with a flexible connection of the blades to the shaft. A bolt positioned through a pair of hangers fixed on the shaft, holds a ring which in turn holds a pair of blades. The attaching hole in the blades for attaching the blade to the ring is a elliptical shape to provide more room for the blade to slide on the ring, which allows the blade to swing back and forth more readily as it slashes through the bush to be pruned. In order to achieve larger cutting areas, a number of separate flail type cutting machines can be combined in a single apparatus, as back and front additions to a tractor. One example is described in U.S. Pat. No. 4,631,910, entitled MOWER, ESPECIALLY FOR GRASS AT AIRPORTS and issued to Doyen et al. on Dec. 30, 1986. Doyen et al. describe an arrangement for combining a number of separate flail type machines in which a first machine is attached closest to a tractor's width on the front of the tractor and additional machines are attached to the back of the tractor in pairs, offset to either side of the front machine so that the pairs of machines attached to the back are staggered, and in which at least one additional hydraulic motor independent of the tractor motor is attached to drive the back machines.

Those prior art machines have not been successfully used to prune bushes of the like perennial crops. Therefore, there is an existing need for a pruning apparatus, particularly for cutting and shredding lower bushes on the ground surface, such as Blueberries on a commercial scale.

SUMMARY OF THE INVENTION

It is one object of the present invention to provide a pruning apparatus adapted to prune low bushes on the ground surface.

It is another object of the present invention to provide a pruning apparatus adapted to prune low bushes, particularly Blueberries on a commercial scale.

It is yet another object of the present invention to provide a connection arrangement for conveniently combining a selected number of pruning units into a pruning machine having a selected pruning width.

It is a further object of the present invention to provide a relatively uniform pruning of low bushes on an uneven ground surface.

In accordance with one aspect of the present invention, a pruning apparatus is provided. The pruning apparatus comprises a plurality of ground work units, each including a plurality of tool members operatively connected to a drive shaft rotatably supported by a housing and rotated by a drive means for effectively pruning a sub-area of a ground surface when being advanced; a wheeled main frame adapted to be towed behind a propelling vehicle, the main frame selectively connecting a number of the ground work units staggered in front and rear rows to provide a selected width of a pruning area including the pruning sub-areas of the individual ground work units; and a connecting means for connecting the respective ground work units to the main frame, with the connecting means each ground work unit being pivotable with respect to the main frame, about a forwardly directing and substantially horizontal axis within a limited range, and pivotable about a vertical axis, and also being slidable to a selected transverse position relative to the main frame, whereby the pruning apparatus generally conforms to an uneven contour of the ground surface and effects continuous and relatively consistent pruning along the entire selected width of the pruning area.

It is preferable that the connecting means includes a plurality of connecting bars, each having a predetermined length and being pivotally connected at a front end thereof to the main frame and slidably connected at a rear end to one of the ground work units.

The connecting bar in accordance with one embodiment of the present invention includes an aperture at the front end thereof for receiving a pivoting pin which vertically extends through the aperture of the connecting bar and a hole in the main frame. At least either one of the aperture and the hole, is greater than the diameter of the pivoting pin in order to permit the connecting bar to be pivotable, not only about the pivoting pin but also about a longitudinal axis of the connecting bar within a limited range. At the rear end, the connecting bar has a sleeve secured thereto. The sleeve has a central axis perpendicular to the longitudinal axis of the connecting bar and slidably surrounds a sliding rod secured to the ground work unit. The sliding rod is parallel to the drive shaft of the ground work unit.

In this embodiment each ground work unit includes a housing having an open bottom and a drive shaft rotatably supported to the housing. Each of the tool members operatively connected to the drive shaft is in a general L-shape having an outer cutting section with cutting edges and an inner mounting section. An elongated aperture is provided in the inner mounting section, extending along a longitudinal axis of the inner mounting section. A plurality of pairs of axially spaced brackets are fixed to a peripheral surface of the drive shaft. A U-shaped connector extends loosely through the elongated aperture in the inner mounting section of a pair of the tool members that are secured to abut each other at the inner mounting sections in order to form a general T-shape. A pin pivotally connects two ends of the U-shaped connector to the axially spaced brackets. When the drive shaft is rotated and advanced, the tool members swing and slash into the bushes to achieve a pruning effect by both cutting and flailing actions. The elongated aperture in the inner mounting section of the tool member provides more room for the tool member to slide on the U-shaped connector and permits the tool member to swing back and forth more readily as it slashes through the bushes which are to be cut. Thus, the ground work unit is adapted to effectively prune both small and tender branches as well as the relatively thick stems of bushes.

A drive chain and sprocket assembly is preferably provided for rotating the drive shaft. The chain and sprocket assembly is operatively supported by the housing of the ground work unit. A sliding rod is also supported on the housing and preferably extends along the entire length of the ground work unit. Each of the ground work units is supported on the ground surface, for example, by a pair of skid shoes or a pair of elongated rollers which are adjustable relative to the housing so that the ground work unit is supported in a selected vertical position with respect to the ground surface in order to determine a pruning depth.

The embodiment of the present invention is provided with a lift system including an hydraulic cylinder, pivoting arms and lift chains to lift the respective ground work units with respect to the main frame so that the ground work units may be raised off the ground surface when it is requested, such as for transportation.

The respective ground work units according to this embodiment are driven by a power distribution system which includes a gear box with a clutch operatively connected to a power take-off system of the towing vehicle. A number of power drive shafts are used to transmit a rotation movement from the power take-off system of the vehicle to the drive chain and sprocket assembly of the respective ground work units. The drive shafts are connected to the drive chain and sprocket assemblies and the gear box by means of universal joints.

The present invention provides a convenient arrangement for combining a selected number of ground work units into a pruning apparatus having a desired pruning width. The sliding connection between the connecting bar and the sliding rod of the ground work unit enables the ground work unit to be selectively positioned in a transverse position in each row with respect to the main frame so that when the number of ground work units to be used is changed, for example, from 3 units to 2 units, the position of the ground work units can be easily adjusted to ensure the ground work units in front and rear rows are staggered properly, whereby the pruning areas effected by the respective ground work units overlap and form a continuous and relatively consistent pruning area having a desired width.

The connection between the connecting bar and the main frame permits pivotal movements around both a vertical axis and a substantially horizontal axis in a forward direction. This connection permits each ground work unit to be independently pivotable about a substantially horizontal axis to adapt to an uneven ground surface. A typical connector for such a purpose is a universal joint. Nevertheless, according to the present invention, this connection is achieved by a connecting pin vertically extending through apertures in the front end of the connecting bar and in the main frame. Conventionally, such a connecting pin provides a connection pivotable only about a vertical axis, but not about a substantially horizontal axis in the forward direction. In order to provide limited pivoting around a substantially horizontal axis in the forward direction for the ground work unit, relative to the main frame, the diameter of either one or both of the apertures in the connecting bar and in the frame is greater than the diameter of the connecting pin to such an extent as to permit the connecting bar to rotate at a slight angle around its longitudinal axis when the connecting bar is such connected to the main frame. It is noted that the pruning apparatus is generally used on agricultural lands which have a generally flat ground surface with slightly uneven areas such as embranchment areas or sections of lands adjacent to a roadside. The limited pivoting feature of a ground work unit is satisfactory to conform to the slightly uneven surface of these areas of lands. This connection structure is therefore simpler and as a result, manufacturing costs are reduced.

Other advantages and features of the present invention will be better understood with reference to the preferred embodiments thereof described below.

BRIEF DESCRIPTION OF THE DRAWINGS

Having thus generally described the nature of the invention, reference will now be made to the accompanying drawings for exemplary purposes only, showing the preferred embodiments of the present invention, in which:

FIG. 7b is a side elevational view of the tool member shown in FIG. 7a;

FIG. 8 is a side elevational view of the drive shaft with the tool member assemblies; and FIGS. 9a–9c are schematical views showing a power distribution system according to different embodiments of the present invention.

DESCRIPTION OF THE PREFERRED EMBODIMENTS

Figure 1:
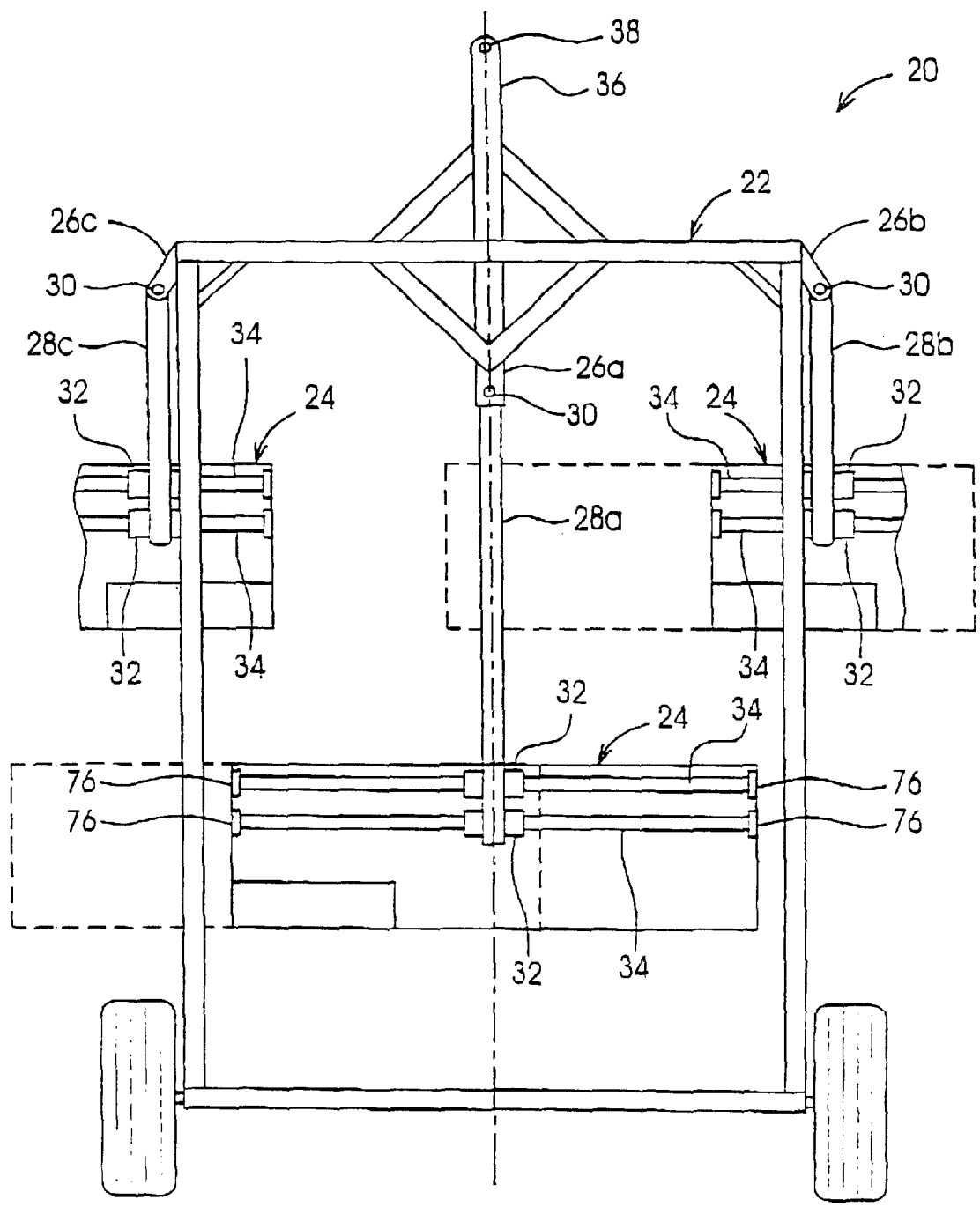
FIG. 1 is a partial top view of an apparatus according to one preferred embodiment of the present invention, with lift mechanisms and a power distribution system removed, showing the connection and positions of the multiple ground-working units with respect to a main frame.
Figure 2:
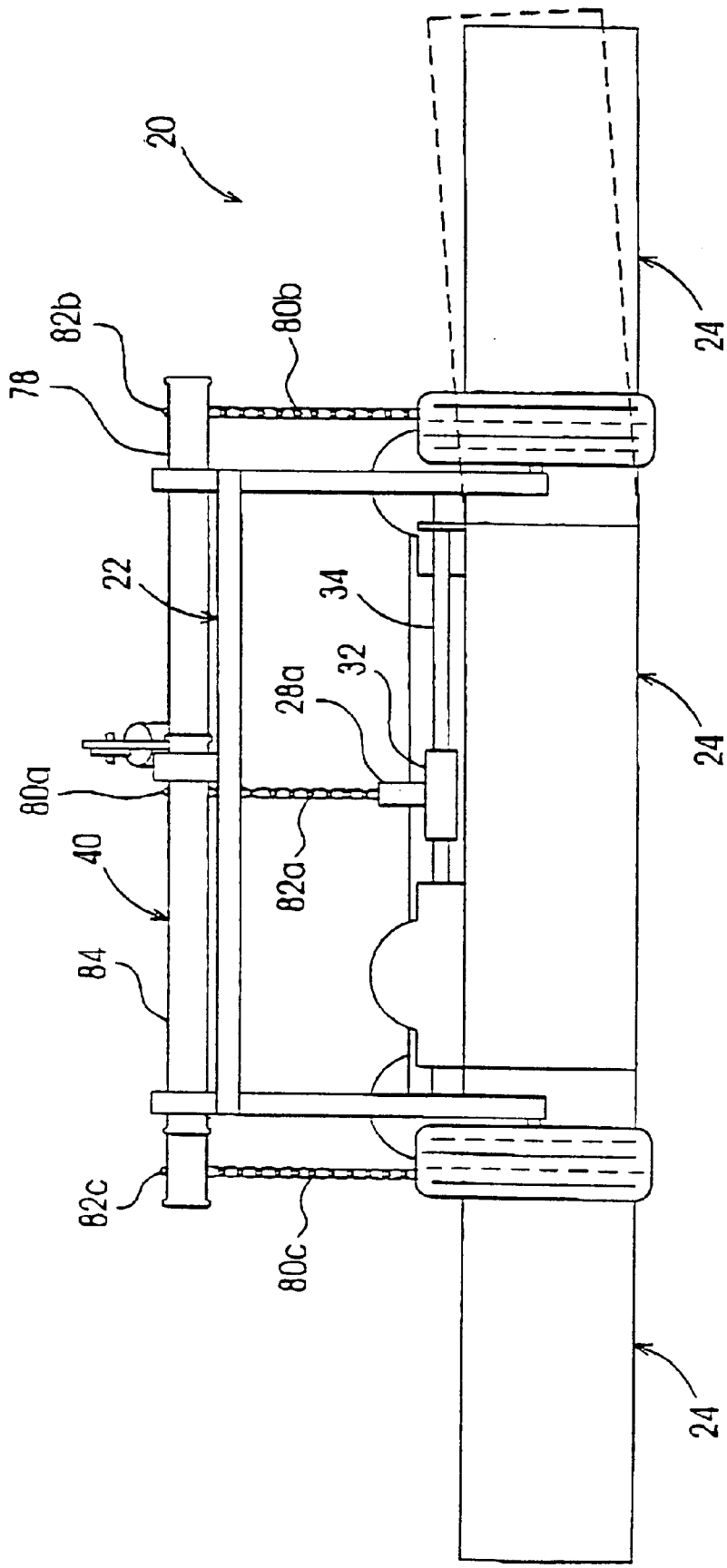
FIG. 2 is a rear elevational view of the apparatus in FIG. 1, including the lift mechanisms.

Referring to the drawings, particularly to FIGS. 1 and 2, a field pruning apparatus according to one embodiment of the present invention, generally indicated at numeral 20, includes a wheeled main frame 22 and three elongated ground work units 24 connected to the front part of the main frame 22, one being positioned in a rear row at a central position and the other two being positioned in a front row, spaced apart from one another and symmetrical about a center axis of the main frame 22. The distance between the two spaced apart ground work units 24 in the front row is smaller than the length between the two opposite ends of the ground work unit 24 in the rear row so that the effective width of the ground work unit 24 in the rear row, overlaps at the opposite ends thereof, the effective widths of the respective two ground work units 24 in the front row when the apparatus 20 is advanced by a propelling vehicle (not shown) in operation.

The main frame 22 has a center connector 26a and two side connectors 26b and 26c fixed to the front part thereof. The center connector 26a is connected to a front end of a connecting bar 28a by means of a pin 30 which extends vertically through an aperture in the center connector 26a and an aperture (not shown) in the front end of the connecting bar 28a, and is secured, for example by nuts. Either one or both of the apertures is sized greater than the diameter of the pin 30 to such an extent that the connecting bar 28a is not only permitted to pivot about a pin 30 but is also permitted to pivot slightly around the longitudinal axis of the connecting bar 28a which is substantially horizontal in a forward direction. At the rear end of the connecting bar 28a there are a pair of sleeves 32 fixed to the connecting bar 28a and slidably surrounding a pair of sliding rods 34 respectively. The two sliding rods 34 extend parallel to the axis of the elongated ground work unit 24, and are spaced apart from each other and secured to the top of the ground work unit 24 at the opposite ends thereof.

In a similar manner, connecting bars 28b and 28c are connected at their rear ends to the ground work units 24 in the front row and are connected at their front ends to the respective side connectors 26b and 26c in order to permit the ground work units 24 in the front row to pivot about a vertical axis, and to pivot slightly about a horizontal axis directing in the forward direction. An example of the right hand ground work units 24 in the front row slightly pivoting about the horizontal axis directing in the forward direction, is shown by broken lines in FIG. 2, which permits the apparatus 20 to conform to the contour of an uneven ground surface when working on an agricultural field in order to achieve a uniform pruning effect. The position of each ground work unit 24 with respect to the main frame 22 can be selected by changing connecting bars having different lengths, and moving the sleeves 32 along the sliding rods 34. A means for locking the sleeve 32 on the sliding rod 34 is provided, which is well known in the art and is not shown or further described. With such a selectively positioning feature, the apparatus 20 is adapted to adjust its pruning width. For example, the broken lines in FIG. 1 illustrate the apparatus according to another embodiment of the present invention, having two ground work units 24, one in the front row and the other in the rear row.

The main frame 22 includes a towing connector 36 fixed to the front part thereof for connecting the towing vehicle (not shown). Similar to the connectors 26a, 26b and 26c, the towing connector 36 includes an aperture for loosely receiving a connecting bolt 38 so that when the connecting bolt 38 is connected to the towing vehicle, the connection permits the main frame 22 to pivot about the connecting bolt 38 and provides the flexibility for the main frame 22 to slightly pivot about the horizontal axis directing in the forward direction.

A lift mechanism 40 as shown in FIG. 2 is operatively attached to the main frame 22 and will be discussed in greater detail hereinafter.

Figure 3:
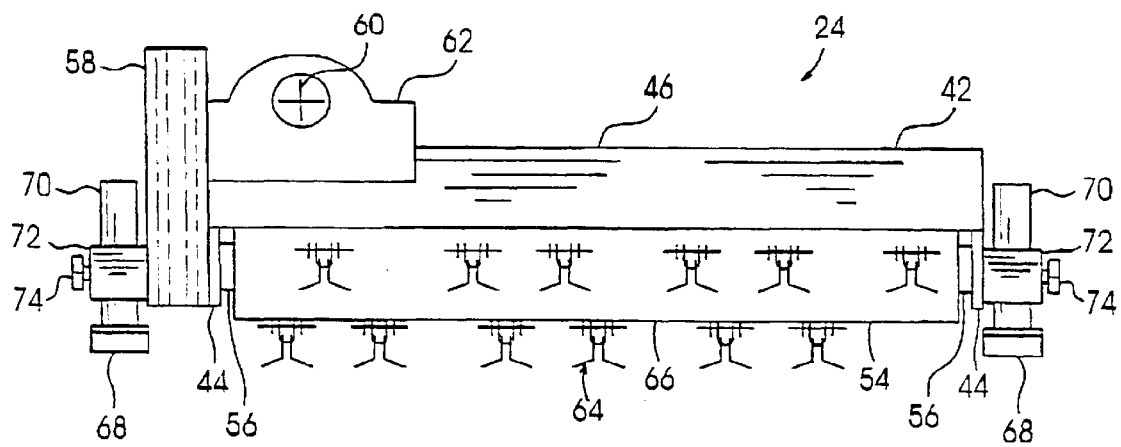
FIG. 3 is a detailed rear elevational view of a ground-working unit of the apparatus in FIG. 2 showing the drive shaft with tool member assemblies attached thereto and the adjustable supporting structure.
Figures 4A, 4B:
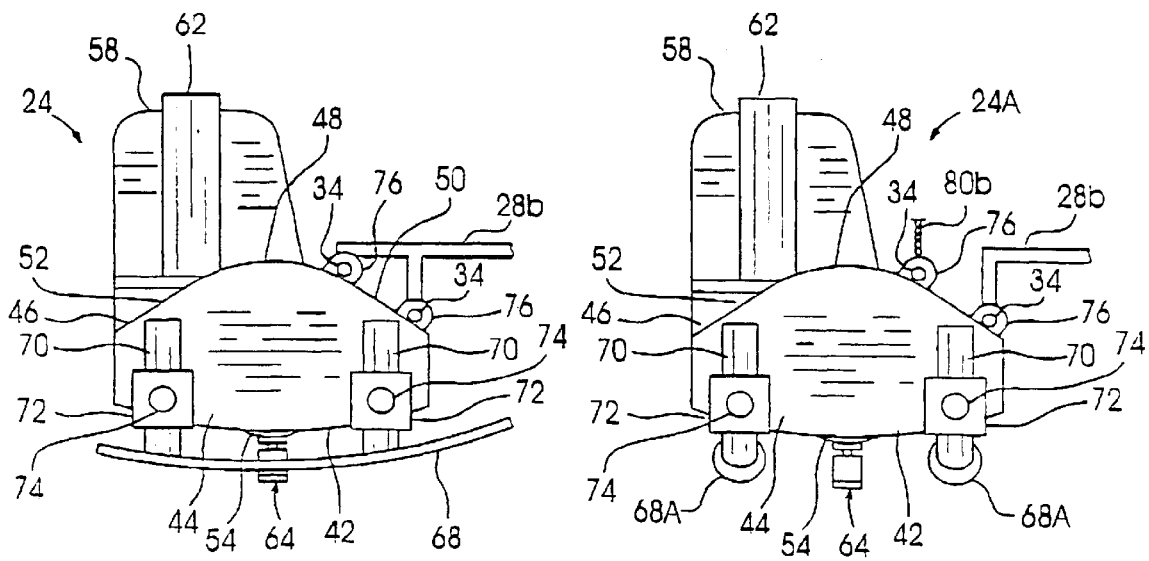
FIG. 4a is a side elevational view of the ground-working unit in FIG. 3, showing the adjustable supporting structure.
FIG. 4b is a view similar to FIG. 4a, showing the adjustable supporting structure according to another embodiment of the present invention.

The ground work unit 24 is described with reference to FIGS. 3 and 4a. The ground work unit 24 includes a housing 42 constructed with two end walls 44 and a roof-shaped top wall 46 extending between the two end walls 44. The roof-shaped top wall 46 has a smoothly curved center portion 48, a front portion 50 extending forwardly and downwardly from the center portion, the rear portion 52 extending rearwardly and downwardly from the center portion, as shown in FIG. 4a. The roof-shaped top wall 46 is made integrally of a single metal plate. The roof-shaped top wall 46 and the end walls 44 form the housing 42 with a widely open bottom.

A drive shaft 54 is an elongated metal cylinder with two opposite ends closed. A pair of journals 56 extend outwardly from the closed ends of the drive shaft 54 and are rotatably supported by the respective end walls 44, so that the drive shaft 54 is parallel to the axis of the elongated ground work unit 24. A driving box 58 is attached to one end wall 44 and covers a chain and sprocket assembly (not shown) which interconnects at its input end to a universal joint connector 60 and at its output end to one of the journals 56 of the drive shaft 54 in order to form a drive means for receiving a rotational movement input and thereby rotating the drive shaft 54. The universal joint connector 60 is operatively supported within a casing 62 which is attached to the top of the roof-shaped top wall 46 of the housing 42 and has openings in both front and rear sides for receiving power drive shafts 112a, 112b, and 112c as shown in FIGS. 9a–9c to be connected to the universal joint connector 60 at either, or both sides thereof. The chain and sprocket assembly with the universal joint connector 60 can be positioned at either end of the ground work unit 24, or the universal joint connector 60 can be positioned at the middle of the ground work unit 24 to provide a convenient connection to a power distribution system when the ground work unit 24 is placed in a selected position with respect to the main frame 22. This will be further explained with reference to FIGS. 9a–9c hereinafter.

A plurality of tool member assemblies 64 are attached to the peripheral surface 66 of the drive shaft 54 in order to effect a cutting and flailing on the subject, such as branches of Blueberry bushes, when the drive shaft 54 is rotated and advanced. The structural details of the tool member assembly 64 will be further described with reference to FIGS. 6–8 hereinafter. The tool member assemblies 64 are positioned with respect to the drive shaft 54 in three rows which are equally and circumferentially spaced apart from one another around the peripheral surface 66 of the drive shaft 54, as shown in FIG. 8. The tool member assemblies 64 in the three rows are positioned in a pattern so that the tool member assemblies 64 in one row are axially offset from the tool member assemblies 64 in another row and the spaces between adjacent tool member assemblies 64 in one row are covered by the combination of the tool assemblies 64 of the other two rows. One example of such a pattern is illustrated in FIG. 3 (only two rows are visible). This patent ensures that the tool member assemblies 64 effect a continuous pruning area on the ground surface without un-pruned strips therein when the drive shaft is rotated and advanced.

A pair of skid shoes 68 are provided for supporting the ground work unit 24 and sliding on the ground surface when the drive shaft 54 is rotated and the apparatus is advanced. Each skid shoe 68 has two upstanding beams 70 fixed on the top thereof. Each upstanding beam 70 slidably extends through a vertical passage (not shown) in a side block 72 affixed to the external side of the end wall 44 at one end of the ground work unit 24. Thus the skid shoe 68 is adjustable for a vertical position with respect to the housing 42 and the relative vertical position of the skid shoe 68 is locked by locking bolts 74 which are threadedly engaged in side bores in the respective side blocks 72 and abut the respective upstanding beams 70. At the other end of the ground work unit 24, a pair of side blocks 72 are affixed to the outer side of the drive box 58. Two ear plates 76 are securely attached to each end of the ground work unit 24 on the front section 50 of the roof-shaped top wall 46 as shown in FIGS. 1 and 4a, for securely supporting the sliding rods 34 in a position parallel to the drive shaft 54.

Figure 5B:
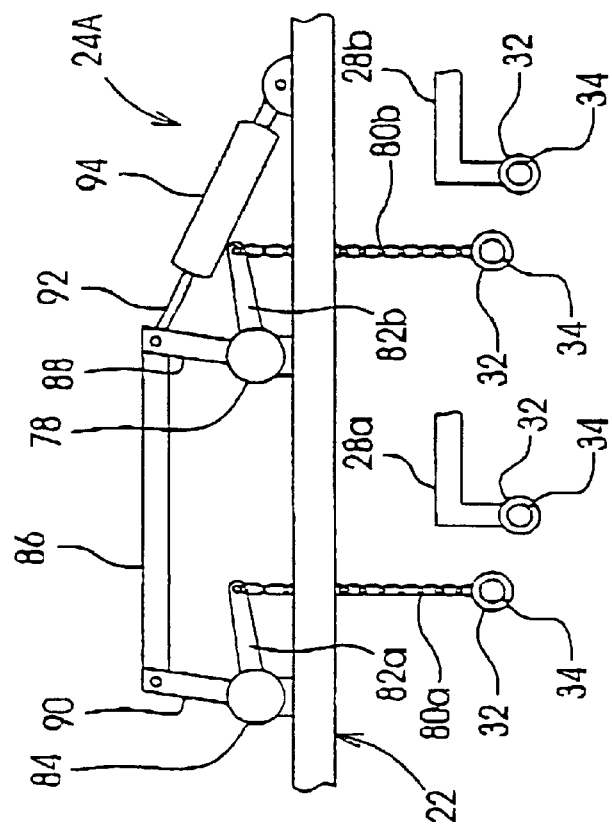
FIG. 5b is a view similar to FIG. 3a, showing the lift mechanisms according to another embodiment of the invention.
Figure 5A:
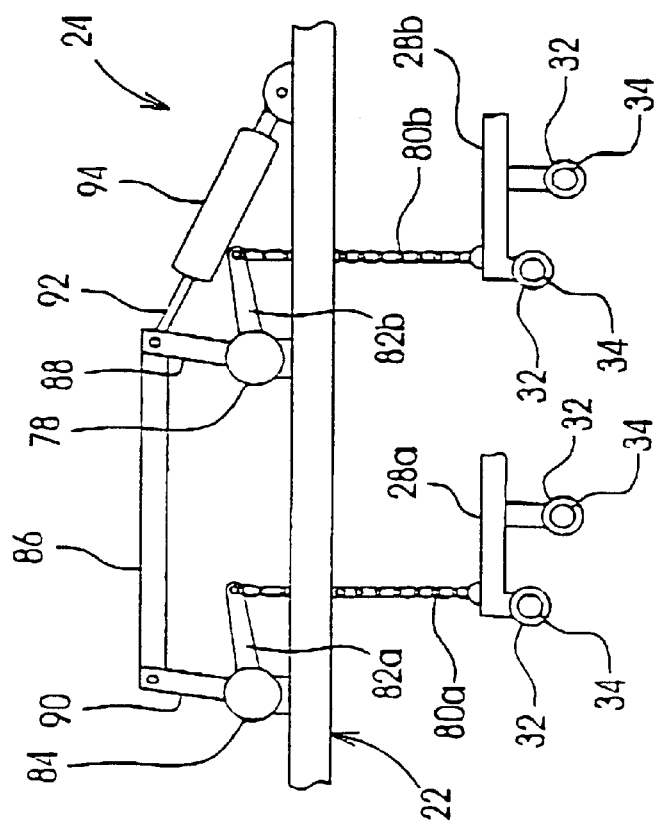
FIG. 5a is a partial side view of the apparatus in FIG. 2 showing the details of the lift mechanisms.

The lift mechanism 40 as illustrated in FIG. 2, includes a front pivoting shaft 78 extending transversely across an entire width of the main frame 22 and pivotally supported on the top and opposite sides of the main frame 22. Two chains 80b and 80c are secured at their low end to the rear end of the connecting bar 28b and 28c, and are affixed at their upper end to the lift arms 82b and 82c, which is more clearly shown in FIG. 5a. In FIG. 5a the lift arm 82c, chain 80c and the connecting bar 28c are positioned behind their corresponding parts 82b, 80b and 28b, and are not visible.

A rear pivoting shaft 84 extends from one side of the main frame 22 inwardly across a distance greater than a half of a width of the main frame 22, and is pivotally supported on the top at the one side and in a central position of the main frame 22. The top part of the main frame 22 has a beam extending along the longitudinal central axis of the main frame 22 to pivotally support the inner end of the rear pivoting shaft 84, which is not visible in FIG. 2. The rear pivoting shaft 84 has a lift arm 82a securely attached with a chain 80a to connect the rear end of the connecting bar 28a to the lift arm 82a.

A link beam 86 is pivotally connected at its opposite ends to a pair of link arms 88 and 90 which are parallel to each other and affixed to the respective pivoting shafts 78 and 84. The link beam 86 is further pivotally connected at the front end to a ram 92 of an hydraulic cylinder 94 which is pivotally mounted on the top part of the main frame 22, whereby the link beam 86 moves rearwardly and rotates the both pivoting shafts 78 and 84 to result in a lift action of all the connecting bars 28a, 28b and 28c when the link beam 86 is actuated by the hydraulic cylinder 94. Thus, the all three ground work unit 24 can be raised up off the ground surface when requested, such as for transportation, after the connecting bars 28a, 28b and 28c are disconnected from the central and side connectors 26a, 26b and 26c of the main frame 22.

The ground work unit 24A according to another embodiment of the present invention is described with reference to FIG. 4b in which similar parts are indicated with the same numerals as those shown in FIG. 4a and therefore will not be redundantly described. A first structural difference of the ground work unit 24A is that the pair of skid shoes 68 adjustably attached to the opposite ends of the ground work unit 24 in FIG. 4a are replaced by a pair of elongated rollers 68A which extend parallel to the drive shaft 54, one being positioned at a front side thereof and the other being positioned at a rear side thereof, with respect to the drive shaft 54. Each elongated roller 68A is rotatably mounted at its opposite ends to the lower ends of the upstanding beams 70. The elongated rollers 68A support the ground work unit 24A and roll on the ground surface when the ground work unit 24A is in operation. The vertical position of the elongated rollers 68A is adjustable by sliding the upstanding beams 70 with respect to the slide blocks 72, similarly to the adjustment of the skid shoes 68 of the ground work unit 24 in FIG. 4a. It is noted that the two upstanding beams 70 at the opposite ends of the ground work unit 24A for connecting a single elongated roller 68A must be vertically adjusted synchronously to maintain the elongated roller 60A in the proper position parallel to the drive shaft 54.

A second change of the ground work unit 24A in FIG. 4b, in contrast to the ground work unit 24 in FIG. 4a is that the ground work unit 24A is slidably connected, by means of one sleeve 32 (not visible in FIG. 4b but shown in FIG. 5b) to one sliding rod 34 at the relatively front side. The chain 80b is slidably connected through the other sleeve 32, as shown in FIG. 5b, to the other sliding rod 34. With such an arrangement, when the chain 80b lifts the ground work unit 24A off the ground surface, the connecting bar 28b does not need to be detached from the main frame 22 because the ground work unit 24A is adapted to be pivotable counterclockwise about the axis of the front sliding rod 34.

Figure 7B:
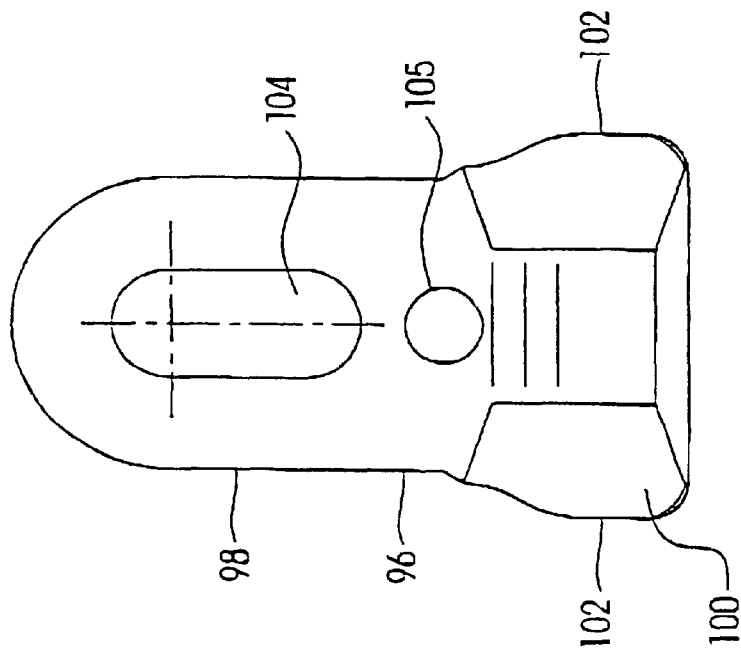
Figure 7A:
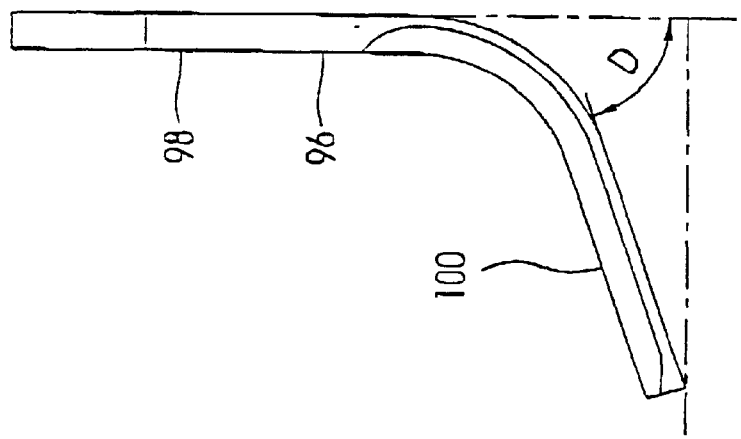
FIG. 7a is a rear elevational view of a tool member shown in FIG. 6.
Figure 6:
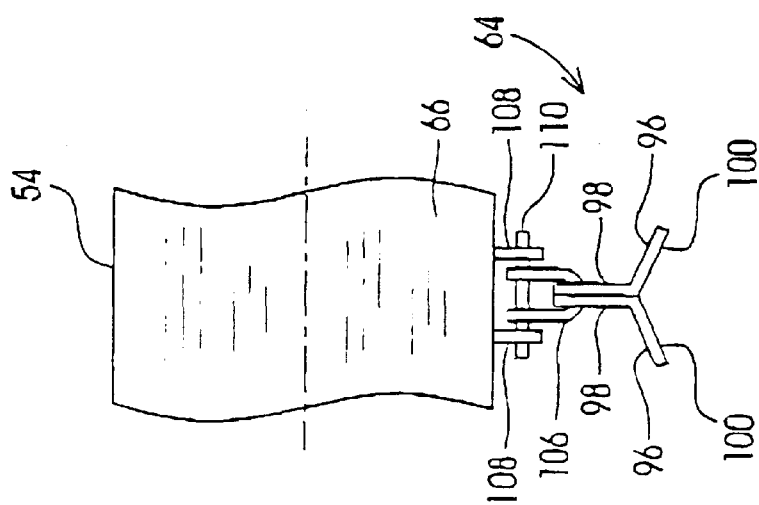
FIG. 6 is a rear elevational view of a tool member assembly shown in FIG. 3.

The tool member assembly 64 will now be described with reference to FIGS. 6–8. The tool member assembly 64 includes a pair of tool members 96. Each tool member 96 has a flat inner mounting section 98 and an outer cutting section 100 which are integrally made from one elongated piece of steel bent at an angle within a range from 65° to 80°, preferably 72° as indicated by the arrows and D in FIG. 7a. The outer cutting section 100 includes a cutting edge 102 at each side thereof and the inner mounting section 98 has an elongated aperture 104 extending in a longitudinal direction of the elongated piece of steel.

The pair of tool members 69 are placed together, the inner mounting section 98 of one tool member 96 abutting the inner mounting section 98 of the other tool member 96, whereby the outer cutting sections 100 extend outwardly and downwardly. A connector 106 formed by a rod bent in a U-shape extends through the elongated apertures 104 of the pair of tool members 96. The -shaped connector 106 is pivotally mounted at the two ends to a pair of brackets 108 that are axially spaced apart and affixed to the peripheral surface 66 of the drive shaft 54, by means of a pivoting pin 110. The pair of the tool members 96 are preferably bound together by a bolt and a nut or a rivet (not shown) through a hole 105 in the inner mounting section 98. With such an arrangement, the U-shaped connector 106 is able to pivot about the pivoting pin 110 together with the connected pair of tool members 96 in either direction, until the tool members 96 are stopped by the peripheral surface 66 of the drive shaft 54. The pair of tool members 96 are adapted to not only pivot about the U-shaped connector 106 but also to slide on the U-shaped connector 106. Thus, the tool member assembly 64 forms a flail, and the tool members 96 not only perform a cutting action by the cutting edges 102, but also effect a flailing action by the entire tool members 96 when the drive shaft 54 is rotated. During the rotation of the drive shaft 54, the tool members 96 rotate together with the drive shaft 54 and radially extend, under a centrifugal force thereof, from the drive shaft 54. Nevertheless, the tool members 96 are deviated by objects to be pruned, such as branches of Blueberry bushes, from the radial direction towards an angular direction in a cross-sectional plane of the drive shaft 54, as shown in FIG. 8, when the tool members 96 slash through the bushes. The deviated angular directions of individual pairs of tool members 96, or one pair of tool members 106 in individual cutting and flailing actions, are different and are determined by the cutting and flailing forces exerted by the individual pairs of tool members 96 against different objects. For example, smaller cutting and flailing forces are required and the tool members 96 will be less deviated from the radial direction when the tool members 96 cut and flail relatively smaller and tenderer branches of Blueberry bushes above the ground surface, in contrast to the situation in which the tool members 96 cut and flail relatively thicker stems of Blueberry bushes 2.5 cm deep into the ground. The cutting and flailing depth above or into the ground surface is adjusted by the adjustable skid shoes 68 or the rollers as illustrated in FIGS. 4a and 4b.

The tool member 96 may be made in various shapes and without cutting edges when it includes the elongated aperture 104 to be loosely connected to the U-shaped connector 106 to form a flail assembly in order to meet different requirements in various applications.

A power distribution system for the embodiment shown in FIG. 1 is schematically illustrated in FIG. 9a. In accordance with this embodiment, two ground work unit 24 in the front row have their universal joint connector casing 62 positioned at different ends thereof for a convenient connection to the power distribution system, the right ground work unit 24 having its universal joint connector casing 62 positioned at its left end and the left ground work unit 24 having its universal joint connector casing 62 positioned at its right hand end. The ground work unit 24 in the rear row can be selected to have its universal joint connector casing 62 positioned at either end thereof. The universal joint connectors 60 of the ground work unit 24 are interconnected to the universal joint connectors 114 of a gear box 116 by the respective power drive shaft 112a, 112b and 112c. The gear box 116 includes a clutch and gear transmission assembly (not shown) connected to the power take-off system of the propelling vehicle (not shown), whereby, when the ground work units 24 are connected to the main frame 22 as shown in FIG. 1 and are towed by the propelling vehicle for operation, the power from the propelling vehicle is distributed by the gear box 116 to drive the individual power drive shafts 112a, 112b and 112c. The rotational movement of each power drive shaft 112a, 112b and 112c is transmitted through the chain and sprocket assembly in the drive box 58 to rotate the drive shaft 54 (see FIG. 3) in order to perform a pruning action. When the ground work units 24 are lifted off the ground surface and towed by the vehicle such as for transportation, the clutch of the gear box 116 is released so that there is no power distributed by the gear box 116 and the ground work units 24 are not in operation.

In FIG. 9b, an alternative embodiment of the power distribution system is illustrated. The ground work unit 24 in the rear row has its universal joint connector casing 62 positioned at the middle thereof so that the universal joint connector 60 of the ground work unit 24 can be substantially aligned with the center universal joint connector 114 of the gear box 116 to reduce power loss during power transmission from the gear box 116 to the ground work unit 24 in the rear row. Nevertheless, the ground work units 24 must be manufactured in three types: right, left and center types with respect to their universal joint connector casing positions.

When two ground work units 24 are connected to the main frame 22 as shown by broken lines in FIG. 1, each of the ground work units 24 can be directly connected to the gear box 116 for power distribution, similar to the arrangement illustrated in FIG. 9a. An alternative arrangement is illustrated in FIG. 9c in which the ground work unit 24 in the front row is connected to the gear box 116 by a front universal joint connector 60a, the drive shaft 112a and the universal joint connector 114, and the universal joint connector 60 of the ground work unit 24 in the rear row is connected to a rear universal joint connector 60b by a drive shaft 112b.

A series of 2, 3, or 5 ground work units can be used for the pruning apparatus, depending on the application, providing a uniform cut that can be adjusted to the ground. The pruning apparatus according to the present invention can be successfully used as a pruning machine on a commercial scale. As an example, a 3-unit pruning machine according to the present invention permits pruning of a width of ground surface of 3.65 meters. When it is used in Blueberry fields, it can prune the bushes at a rate of 2 to 3 hectares per hour.

Variations, modifications and alterations may be apparent to those skilled in the art. The scope of the invention is intended to be limited only by the scope of the appended claims.

What is claimed is:

1. A pruning apparatus comprising:
   a plurality of ground work units, each including a plurality of tool members operatively connected to a drive shaft rotatably supported by a housing and rotated by a drive means for effectively pruning a sub-area of a ground surface when being advanced;
   a wheeled main frame adapted to be towed behind a propelling vehicle, the main frame selectively connecting a number of the ground work units staggered in front and rear rows to provide a selected width of pruning area including the pruning sub-areas of the individual ground work units; and a connecting means for connecting the respective ground work units to the main frame, with the connecting means each ground work unit being pivotable with respect to the main frame, about a forwardly directing and substantially horizontal axis within a limited range and pivotable about a vertical axis, and also being slidable to a selected transverse position relative to the main frame, whereby the priming apparatus generally conforms to an uneven contour of the ground surface and effects continuous and relatively consistent pruning along the entire selected width of the pruning area characterized in that the connecting means comprises a plurality of connecting bars, each having predetermined length and being pivotally connected at a front end thereof to the main frame, and slidably connected at a rear end thereof to one of the ground work units and the connecting bar comprises aperture at the front end thereof, the aperture receiving a pivoting pin that vertically extends through the aperture of the connecting bar and a hole in the main frame at least either one of the aperture and the hole being greater than a diameter of the pivoting pin to permit the connecting bar to pivot not only about the pivoting pin but also about a longitudinal axis of the connecting bar within the limited range.

2. A priming apparatus as claimed in claim 1 wherein the connecting bar comprises a sleeve at the rear end thereof, having a central axis perpendicular to the longitudinal axis of the connecting bar and slidably surrounding a sliding rod secured to the ground work unit, the sliding rod being parallel to the drive shaft.

3. A pruning apparatus as claimed in claim 1 further comprising a power distribution system, including a gear box operatively connected to a power take-off system of the vehicle and a number of power driving shafts in accordance with the number of the ground work units for transmission of a rotation movement from the power take-off system of the vehicle to the drive means of the respective ground work units.

4. A pruning apparatus as claimed in claim 3 wherein a drive means of each ground work unit comprises a drive chain and sprocket assembly connected to the corresponding power driving shaft by means of a universal joint connector.

5. A pruning apparatus comprising:

a plurality of ground work units, each including a plurality of tool members operatively connected to a drive shaft rotatably supported by a housing and rotated by a drive means for effectively pruning a sub-area of a ground surface when being advanced;

a wheeled main frame adapted to be towed behind a propelling vehicle, the main frame selectively connecting a number of the ground work units staggered in front and rear rows to provide a selected width of a pruning area including the pruning sub-areas of the individual ground work units; and a connecting means for connecting the respective ground work units to the main frame, with the connecting means each ground work unit being pivotable with respect to the main frame, about a forwardly directing and substantially horizontal axis within a limited range and pivotable about a vertical axis, and also being slidable to a selected transverse position relative to the main frame, whereby the pruning apparatus generally conforms to an uneven contour of the ground surface and effects continuous and relative consistent pruning along the entire selected width of the pruning area characterized in that the main frame comprises lift mechanisms including an hydraulic cylinder, pivoting arms and lifting chains to lift the ground work units with respect to the main frame.

6. A pruning apparatus comprising:

a plurality of ground work units, each including a plurality of tool members operatively connected to a drive shaft rotatably supported by a housing and rotated by a drive means for effectively pruning a sub-area of a ground surface when being advanced;

a wheeled main frame adapted to be towed behind a propelling vehicle, the main frame selectively connecting a number of the ground work units staggered in front and rear rows to provide a selected width of a pruning area including the pruning sub-areas of the individual ground work units; and a connecting means for connecting the respective ground work units to the main frame, with the connecting means each ground work unit being pivotable with respect to the main frame, about a forwardly directing and substantially horizontal axis within a limited range and pivotable about a vertical axis, and also being slidable to a selected transverse position relative to the main frame, whereby the pruning apparatus generally conforms to an uneven contour of the ground surface and effects continuous and relatively consistent pruning along the entire selected width of the pruning area characterized in that the tool member comprises integral metal member including an inner mounting section having an elongated aperture along a longitudinal axis of the inner mounting section, and an outer cutting section having a cutting edge, the outer cutting section extending angularly from the inner mounting section so that the tool member is formed in a general L-shape.

7. A pruning apparatus as claimed in claim 6 wherein the outer cutting section extends from the inner mounting section outwardly and laterally at an angle of between 65° and 80° with respect to the longitudinal axis of the inner mounting section.

8. A pruning apparatus as claimed in claim 7 wherein each ground work unit comprises a plurality of mounting means, each mounting means including a pair of brackets fixed to a peripheral surface of the drive shaft, a connector formed with a U-shaped rod extending loosely through the elongated aperture of the inner mounting section of a pair of the tool members secured together to form a general T-shape, and a pin pivotally connecting two ends of the U-shaped connector to the brackets.

9. A pruning apparatus comprising:

a wheeled main frame adapted to be towed behind a propelling vehicle;

a number of ground work units selectively connected to the main frame, staggered in front and rear rows to provide a selected width of a pruning area of a ground surface, each ground work unit including:

a housing having an open bottom, a drive shaft rotatably supported to the housing, a plurality of tool members, each being in a general L-shape, having an outer cutting section and an inner mounting section and having an elongated aperture extending along a longitudinal axis of the inner mounting section, a plurality of mounting means, each including a pair of axially spaced brackets fixed to a peripheral surface of the drive shaft, a U-shaped connector extending loosely through the elongated aperture in the inner mounting section of a pair of the tool members that are secured to abut each other at the inner mounting sections to form a general T-shape, and a pin pivotally connecting two ends of the U-shaped connector to the brackets, a drive chain and sprocket assembly operatively supported by the housing for rotating the drive shaft, a sliding rod supported on the housing, extending parallel to the drive shaft, and an adjustable supporting structure attached to the housing to support the ground work unit in a selected vertical position with respect to the ground surface;

a plurality of connecting means, each including a connecting bar having a predetermined length and an aperture at a front end thereof for receiving a vertically extending pivoting pin to be connected to a hole in the main frame to permit the connecting bar to pivot about the pin and pivot about a longitudinal axis of the connecting bar within a limited range, the connecting bar having a sleeve secured at a rear end thereof for slidably connecting the sliding rod of a corresponding ground work unit;

a power distribution system including a gear box operatively connected to a power take-off system of the vehicle, a number of power drive shafts in accordance with the number of the ground work units to transmit a rotational movement from the power take-off system of the vehicle to the drive chain and sprocket assembly of the respective ground work units; and a lift system including a hydraulic cylinder, pivoting arms and lift chains to lift the respective ground work units with respect to the main frame.

* * * * *